US009504912B2

(12) United States Patent
Ikeda et al.

(10) Patent No.: US 9,504,912 B2
(45) Date of Patent: Nov. 29, 2016

(54) ERGONOMIC GAME CONTROLLER

(75) Inventors: John Ikeda, Seattle, WA (US); Scott Wilson, Chicago, IL (US); Dennis Matthew Puhalla, Chicago, IL (US); Brett Christie, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/221,731

(22) Filed: Aug. 30, 2011

(65) Prior Publication Data

US 2013/0053146 A1    Feb. 28, 2013

(51) Int. Cl.
*A63F 13/24* (2014.01)
*A63F 13/245* (2014.01)
*A63F 13/803* (2014.01)
*A63F 13/285* (2014.01)
*A63F 13/235* (2014.01)

(52) U.S. Cl.
CPC ........... *A63F 13/245* (2014.09); *A63F 13/803* (2014.09); *A63F 13/235* (2014.09); *A63F 13/285* (2014.09); *A63F 2300/1031* (2013.01); *A63F 2300/1037* (2013.01); *A63F 2300/1043* (2013.01)

(58) Field of Classification Search
CPC .................. A63F 13/02; A63F 13/06; A63F 2009/2401; A63F 2009/2402; A63F 2009/2407; A63F 2009/2447; A63F 2300/105; A63F 2300/1043; A63F 2300/1062
USPC .................................. 463/36–38; 434/29, 45
See application file for complete search history.

(56) References Cited

U.S. PATENT DOCUMENTS

| | | | | | |
|---|---|---|---|---|---|
| 4,887,966 | A | * | 12/1989 | Gellerman | 463/38 |
| D328,315 | S | * | 7/1992 | Shulman | D14/414 |
| 5,299,810 | A | * | 4/1994 | Pierce et al. | 463/2 |
| 5,805,256 | A | * | 9/1998 | Miller | 348/734 |
| 5,820,462 | A | * | 10/1998 | Yokoi et al. | 463/37 |
| 6,489,946 | B1 | * | 12/2002 | Takeda et al. | 345/161 |
| 7,775,884 | B1 | | 8/2010 | McCauley | |

(Continued)

FOREIGN PATENT DOCUMENTS

CN    101771836 A    7/2010
CN    201572518 U    9/2010

(Continued)

OTHER PUBLICATIONS

Brown, Brandon. "E3 2011: New Official Xbox 360 Handlebars, I Mean, Driving Wheel Announced". Brandon Brown's blog, Dual Pixels [online]. Jun. 7, 2011. Retrieved from the Internet: URL: <http://www.dualpixels.com/profiles/blogs/e3-2011-new-official-xbox-360>, 4 pages.

(Continued)

*Primary Examiner* — Allen Chan
(74) *Attorney, Agent, or Firm* — Gregg Wisdom; Judy Yee; Micky Minhas

(57) ABSTRACT

A controller for a video game is disclosed. The controller may be a generally U-shaped steering wheel including a pair of hand grips attached to and extending from a base connector. The ends of the hand grips may be angled downward. The design of the hand grips together with the downwardly extending ends provides for an ergonomic design of the controller with easy access to controls on the hand grips whether the controller is grasped with a pronated or supinated hand positions.

19 Claims, 7 Drawing Sheets

(56) References Cited

U.S. PATENT DOCUMENTS

| | | | |
|---|---|---|---|
| D633,853 S * | 3/2011 | Aruga et al. | D12/345 |
| 2003/0045352 A1 | 3/2003 | Ireland et al. | |
| 2006/0142084 A1 | 6/2006 | Chen | |
| 2006/0287085 A1 | 12/2006 | Mao et al. | |
| 2006/0290662 A1 | 12/2006 | Houston et al. | |
| 2007/0265077 A1 | 11/2007 | Tom et al. | |
| 2008/0096654 A1* | 4/2008 | Mondesir et al. | 463/31 |
| 2008/0125224 A1* | 5/2008 | Pollatsek | 463/36 |
| 2010/0149740 A1* | 6/2010 | Cheng | 361/679.4 |

FOREIGN PATENT DOCUMENTS

| | | |
|---|---|---|
| EP | 1230958 | 1/2004 |
| EP | 1852163 A2 | 11/2007 |
| EP | 2039401 A2 | 3/2009 |
| JP | 2002000945 A | 1/2002 |
| JP | 2002224444 | 8/2002 |
| TW | 200709835 A | 3/2007 |
| WO | 2008/057100 A1 | 5/2008 |

OTHER PUBLICATIONS

"Formula Racing Steering Wheel for Wii". ECVV.com [online]. Retrieved from the Internet on Jun. 10, 2011: URL: <http://www.ecvv.com/product/2710388.html>. 3 pages.

"How to set up and use your Xbox 360 Wireless Racing Wheel". Microsoft Support [online]. Feb. 6, 2011. Retrieved from the Internet, URL: <http://support.microsoft.com/kb/927347>. 8 pages.

"Intel Wireless Series Gamepad Accessory". Amazon.com [online]. Retrieved from the Internet on Jun. 13, 2011, URL: <http://www.amazon.com/exec/obidos/ASIN/B00005853O/gemotrack9-20/ref=nosim>. 5 pages.

"Saitek Pro Flight Yoke with Three-Lever Throttle (PZ44)". Amazon.com [online]. Retrieved from the Internet on Jun. 13, 2011, URL: <http://www.amazon.com/Saitek-Flight-Three-Lever-Throttle-PZ44/dp/B000TCD1UK?&camp=212361&creative=383837&linkCode=wss&tag=flightsimyoke-20>. 2 pages.

"Steering wheel for Wii (semi-circle)". ECVV.com [online]. Retrieved from the Internet on Jun. 10, 2011: URL:<http://www.ecvv.com/product/2561560.html>. 3 pages.

English abstract for JP2002224444 published Aug. 13, 2002.

International Search Report and Written Opinion dated Mar. 14, 2013 in International Patent Application No. PCT/US2012/052786.

"Office Action Received for European Patent Application No. 12828592.1", Mailed Date: Jul. 1, 2014, Filed Date: Aug. 29, 2012, 5 pages. (MS# 333285.06).

"Office Action Received for European Patent Application No. 12828592.1", Mailed Date: Jun. 10, 2014, Filed Date: Aug. 29, 2012, 3 pages. (MS# 333285.06).

"Motion sensing & 3D, mass collection of special accessories in E3 game show", Published on: Jun. 16, 2011, Available at: http://digital.it168.com/a2011/0615/1204/000001204877_all.shtml.

"First Office Action and Search Report Received for Chinese Patent Application No. 201210313000.8", and partial English translation thereof, Mailed Date: Aug. 1, 2014, 13 Pages. (MS# 333285.04).

Response to Office Action filed Dec. 12, 2014 in Chinese Patent Application No. 201210313000.8, and partial English translation thereof, 12 pages.

"Second Office Action Issued in Chinese Patent Application No. 201210313000.8", Mailed Date: Mar. 27, 2015, 10 Pages. (MS# 333285.04).

"Office Action and Search Report Issued in Taiwan Patent Application No. 101126246", Mailed Date: Nov. 17, 2015, 14 Pages. (MS# 333285.03).

Response to Office Action filed Feb. 17, 2016 and English translation of claims as amended therein, in Taiwan Patent Application No. 101126246, 12 pages.

Decision to Grant dated May 4, 2016 in Taiwan Patent Application No. 101126246, 4 pages.

* cited by examiner

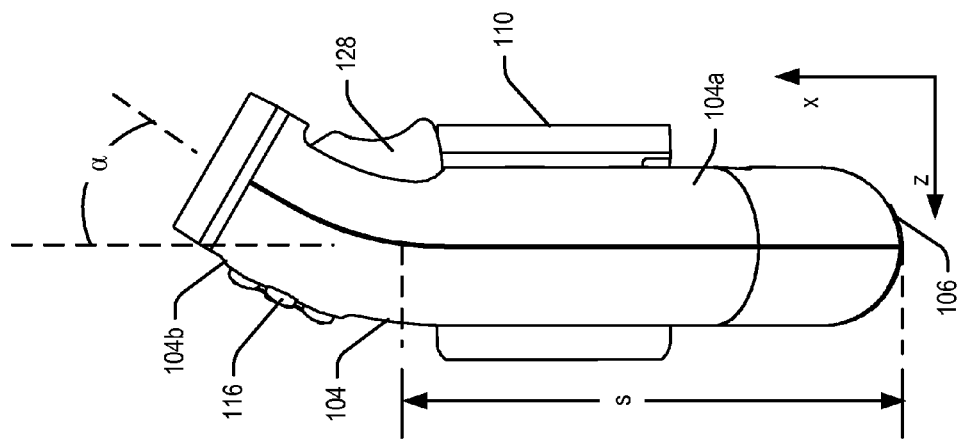
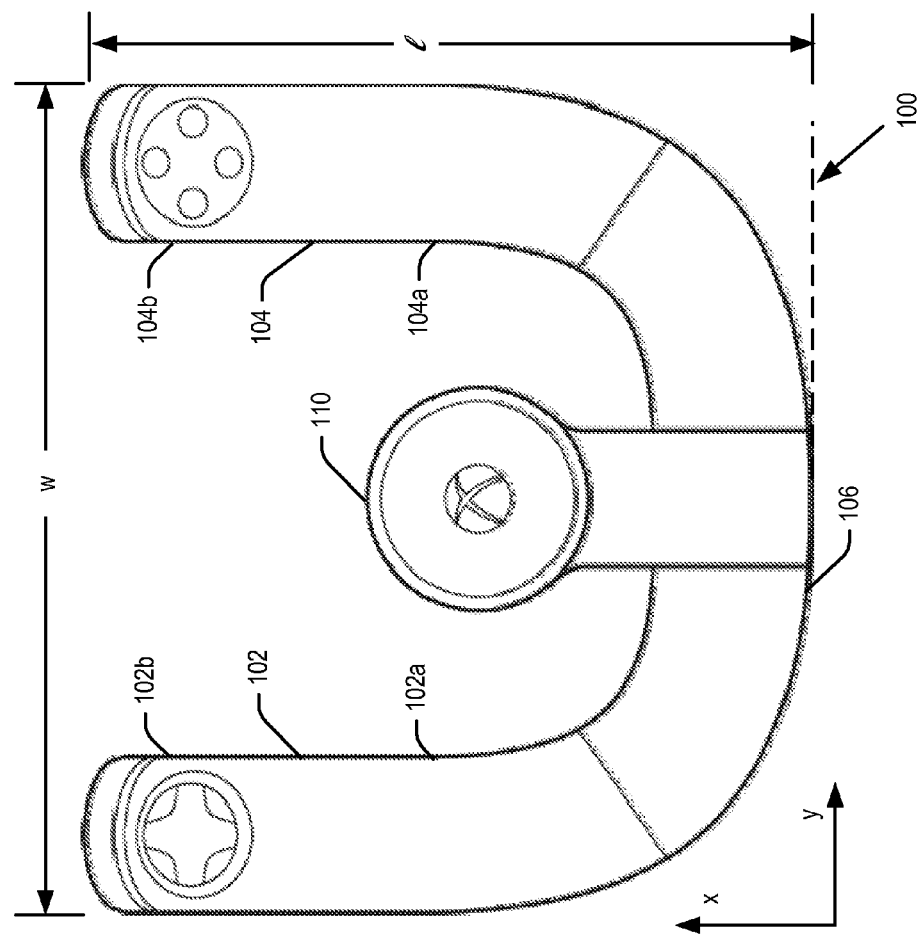
Fig. 1
Fig. 2

ERGONOMIC GAME CONTROLLER

BACKGROUND

The use of game controllers, and more particularly steering wheels, with personal computers or gaming systems is well known. Game controllers, such as steering wheels, have been made circular to resemble steering wheels from automobiles. However, such designs are not well suited to gaming applications. Where cars are driven in a two dimensional x-y plane of the ground, games often employ a third, z-dimension which requires additional articulation of the game controller. Moreover, when using a game controller to steer, users also typically need to manipulate buttons on the controller. These actions make the use of conventional steering wheel game controllers less ergonomic and add strain on the users' fingers, hands and/or arms.

SUMMARY

The present technology in general relates to a controller used in controlling virtual objects in a video game simulation. The controller is generally U-shaped, including a pair of hand grips attached to and extending from a base connector. The ends of the hand grips may be angled downward. These features define an open-ended architecture allowing multiple gaming grip postures (pronated to supinated) with natural and easy access to the controls on the hand grips. In particular, controls may be accessed on a top surface of the hand grips by a user's thumb and controls may be accessed on a bottom surface of the hand grips by a user's index finger. Each of these controls may be accessed while maintaining neutral/relaxed hand/wrist/finger posture while maintaining a secure grip of the controller.

In a first example, the present technology relates to a controller for controlling a video game in a gaming system, comprising: a base connector; first and second hand grips attached to and extending from the base connector; a first end on the first hand grip extending at an oblique angle with respect to a remaining portion of the first hand grip; a second end on the second hand grip extending at an oblique angle with respect to a remaining portion of the second hand grip; a first set of one or more controls on the first end of the first controller; a second set of one or more controls on the second end of the second controller; the controller being free-standing and adapted to be held in any user-defined position while communicating controls to the video game.

In another example, the present technology relates to a controller for steering a virtual object in a video game in a gaming system, comprising: a base connector; first and second hand grips attached to and extending from the base connector; a first end on the first hand grip extending at an oblique angle with respect to a remaining portion of the first hand grip; a second end on the second hand grip extending at an oblique angle with respect to a remaining portion of the second hand grip; a first set of one or more controls on the first end of the first controller; a second set of one or more controls on the second end of the second controller; an inertia measurement unit for measuring acceleration of the controller along three axes, and pitch, roll and yaw about the three axes, the inertia measurement unit allowing control of the virtual object in three dimensional machine space; the controller being free-standing and adapted to be held in any user-defined position while communicating controls to the video game.

In a further example, the present technology relates to a controller for steering a virtual automobile in a video game in a gaming system, comprising: a base connector; first and second hand grips attached to and extending from the base connector; a first end on the first hand grip extending at an oblique angle with respect to a remaining portion of the first hand grip; a second end on the second hand grip extending at an oblique angle with respect to a remaining portion of the second hand grip; a first set of one or more controls on the first end of the first controller; a second set of one or more controls on the second end of the second controller; and an inertia measurement unit for measuring acceleration of the controller along three axes, and pitch, roll and yaw about the three axes, the inertia measurement unit allowing the controller to transmit steering instructions to control steering of the automobile regardless of the orientation of the controller in a user's hands.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

FIG. 1 is a top view of a controller according to embodiments of the present disclosure.

FIG. 2 is a right side view of a controller according to embodiments of the present disclosure.

DETAILED DESCRIPTION

Figure 3:
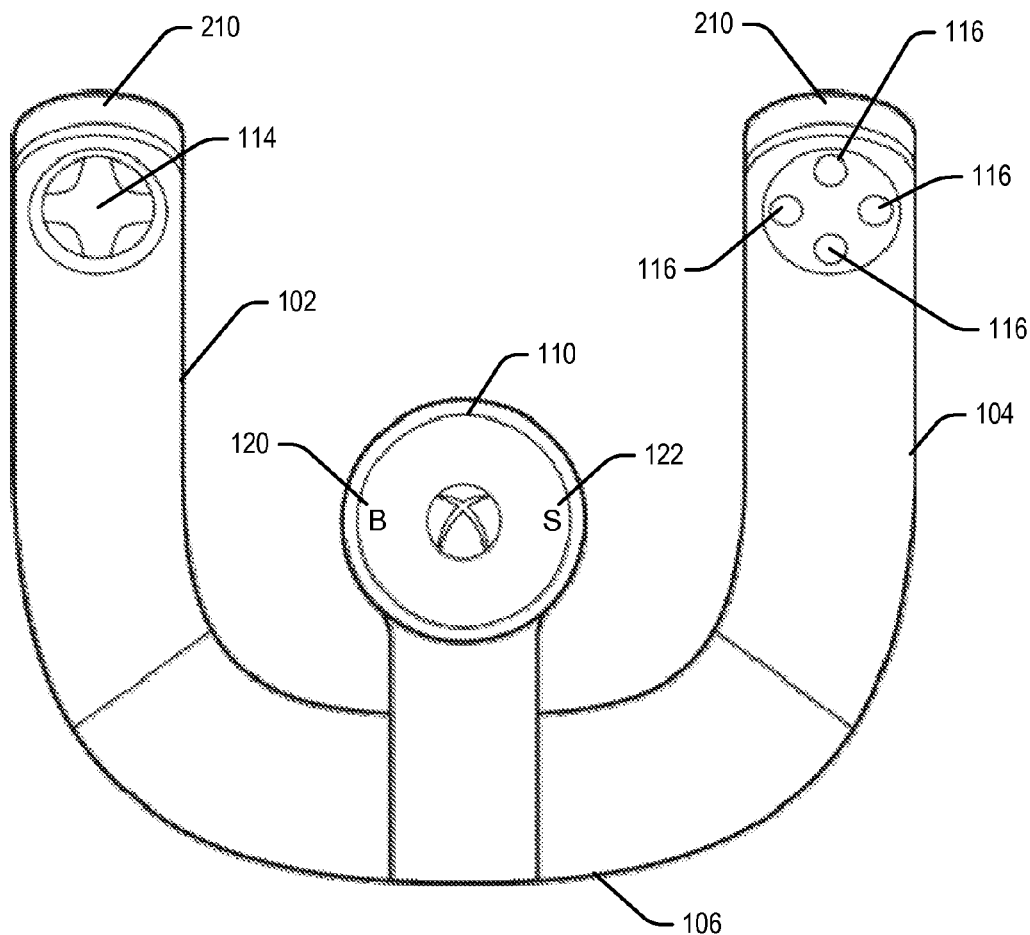
FIG. 3 is a top view of a controller showing controls according to embodiments of the present disclosure.
Figure 4:
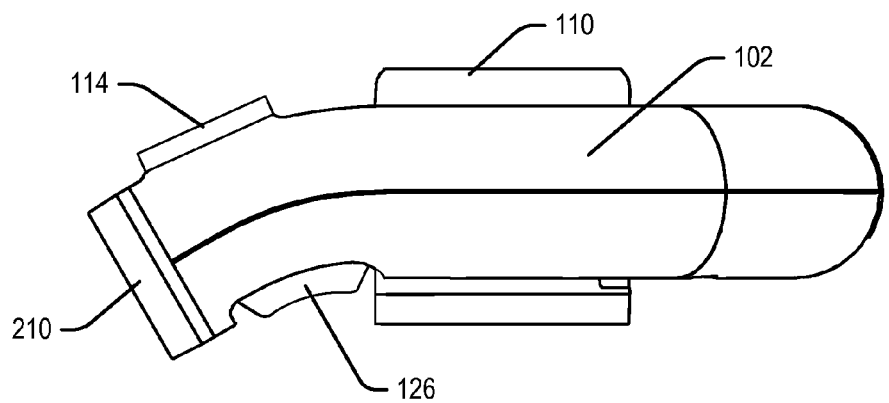
FIG. 4 is a left side view of a controller according to embodiments of the present disclosure.

Embodiments of the present technology will now be described with reference to FIGS. 1-11, which in embodiments relate to a controller that may be used in a video game. In examples, the controller may be a generally U-shaped steering wheel including a pair of hand grips attached to and extending from a base connector. The ends of the hand grips may be angled downward. The design of the hand grips together with the downwardly extending ends provide for an ergonomic design of the controller with easy access to controls on the hand grips whether the controller is grasped with pronated or supinated hand positions.

Referring now to FIGS. 1-4, there is shown a controller 100, which may be used as a steering device that is used in video game simulations. The steering device may be used to control or guide any of various vehicles such as virtual automobiles (including cars and motorcycles), planes, boats, and bicycles. The controller 100 may be used to control driven or ridden onscreen simulated objects in further embodiments, such as for example virtual skateboards, skates, skis and sleds. Controller 100 may be used in a gaming system explained below in greater detail with respect to FIGS. 10 and 11. In one example, the gaming system may be an Xbox 360® video gaming system, but the controller 100 may be used in other gaming systems in further embodiments.

Referring now to FIGS. 1 and 2, in one example, the controller may be a stand-alone unit having two spaced hand grips 102 and 104 connected to each other by a base connector 106. "Stand-alone" refers to the fact that, in embodiments, the controller 100 may not be affixed to or physically coupled with any other device. As explained below, the controller 100 may communicate wirelessly with a computing device executing a video game. In further embodiments, there may be a wired connection.

A hub 110 is connected to and extends from the base connector 106, in between the hand grips 102 and 104. FIGS. 1 and 2 show x, y and z axes, used herein to provide relative orientations of the different parts of controller 100 to each other. Hand grips 102, 104 and base connector 106 may in general have a circular diameter of approximately 30mm, though this diameter may be greater or lesser than that in further embodiments.

As explained below, the hand grips 102 and 104 have an ergonomic design comfortable for being gripped by a user's hands. In further embodiments, the diameter of the hand grips 102, 104 may be customized for users of different ages, so that the hand grips may be smaller than 30mm for users with smaller hands such as children. It is also conceivable that the cross-section of the hand grips 102 and 104 and base connector 106 have shapes other than circular in further embodiments, such as for example elliptical or oval.

The hand grips 102, 104 may be generally parallel to each other and generally perpendicular to the base connector 106. It is understood that the hand grips 102 and 104 may have slightly oblique angles off of the base connector 106 so as to slant a few degrees (e.g., 2-5°) toward or away from each other. The hand grips 102 and 104 and base connector 106 may have central axes that are generally co-planar with each other within the x-y plane. In one example, the controller 100 may have a length, l, of 96 mm, and a width, w, of 185 mm, though these dimensions may vary, proportionately or disproportionately to each other, in further embodiments.

In accordance with the ergonomic aspects of the present disclosure, each hand grip 102, 104 may have a straight section 102a, 104a, respectively, and a bent end section 102b, 104b, respectively. As shown in the edge view of FIG. 2, which shows hand grip 104, the bent end section 104b angles downward with respect to straight section 104a. In embodiments, the straight section 102a, 104a may have a length, s, of approximately 75 mm, though this dimension may be shorter or longer in further embodiments. As seen in FIG. 2, the bent section 104b may form an angle, α, with the straight section 104a which in embodiments may range between 45° and 15°, and may be 30°. The sections 102a, 102b may form the same angles. It is understood that these angles α may be other values within the above-described range, and other values outside of the above-described range.

The hub 110 may be centrally spaced between the hand grips 102 and 104. Hub 110 may in general have a cylindrical shape (with a central axis in the z-direction), and be attached to the base connector 106 via connector section 112.

The controller 100 may in general be formed of a durable, lightweight plastic, such as for example polycarbonate. The hand grips 102 and 104 may be formed of or coated with softer material, such as for example low durometer plastic or rubber. It is understood that the controller may be made of other materials in further embodiments. At least portions of the hand grips 102, 104, base connector 106 and hub 110 may be provided with a hollow space for housing a power source, electronic components and wiring, some of which are explained below.

Controller 100 may have several actuators in the form of buttons, triggers and/or switches to control actions in the video game simulation. These actuators may have known functionality, and in one example, may have the same functionality as the buttons, triggers and/or switches included in the Xbox 360® game controller available from Microsoft Corp., Redmond Wash. Such an example is described below, but it is understood that the following is not intended to be limiting as the actuators of controller 100 may perform a wide variety of functions in different video game simulations.

In one example, hand grip 102 may include a directional pad (D-pad) 114, positioned in the end section 102b of the hand grip. The D-pad 114 may be in the end section 104b of hand grip 104 in a further embodiment. The D-pad 114 includes an actuation surface comprising a cross-shaped input pad. In the example shown, the input pad includes four input arms. In other examples, the input pad may include more or less than four input arms. In one example, the D-pad 114 allows a user to provide directional input control for four distinct ordinate directions (e.g., NSEW) corresponding to the four input arms of the D-pad.

In one example, hand grip 104 may include a set of input or action buttons 116, positioned in the end section 104b of the hand grip. The input buttons 116 may be in the end section 102b of hand grip 102 in a further embodiment. These input buttons may be simple switches, each generating a signal having a binary output to indicate selection by a user. In other examples, the input buttons may be pressure-sensitive switches that generate signals indicating different levels of selection by the user based on the amount of force exerted on a button 116 by a user. Depending on the video game application, buttons 116 may relate to virtual target acquisition in a video game, and they may activate various in-game weapons (for shooting and combat games).

Additional input buttons 120, 122 are provided on hub 110 and may provide additional functions, such as for starting an application (start button S), and navigating a graphical user interface menu (back, forward, etc). The buttons 120, 122 may be provided on a toggle switch formed in a ring on a top surface of the hub 110. Input buttons 120, 122 may provide binary or multi-level response signals.

The controller 100 may further include a trigger 126 (FIG. 4) on hand grip 102 and a trigger 128 (FIG. 2) on hand grip 104. The triggers 126, 128 may be positioned on the underside of the controller 100, in respective end sections 102b, 104b. Triggers 126, 128 may be pressure-sensitive, but need not be in further examples. Depending on the video game application, triggers 126 and/or 128 may for example be an accelerator and a brake (for powered vehicle games).

Figure 9:
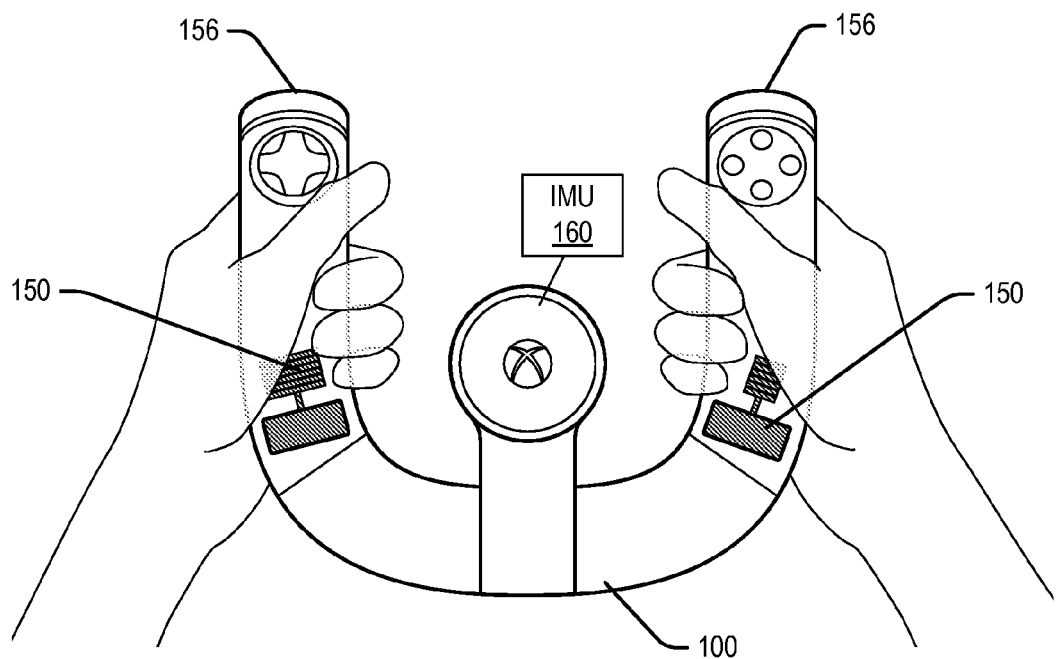
FIG. 9 is a top view of the controller illustrating internal and external components such as rumble motors and lights.
Figure 9A:
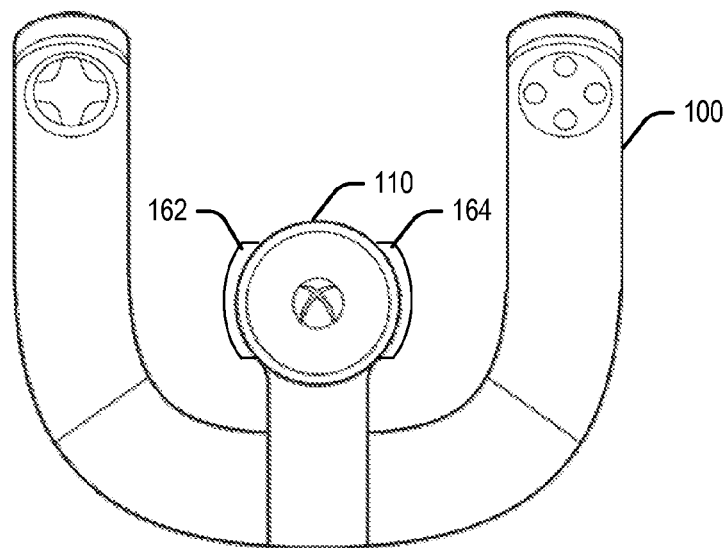
FIG. 9A is a top view of a further example the controller illustrating further actuators such as paddle shifters.

The controller 100 may include further actuators for providing input to a video game simulation in further embodiments. For example, FIG. 9A shows an example of controller 100 including paddle shifters 162 and 164 mounted off of the sides of hub 110. Paddle shifters may provide input to a video game simulation, such as for example for shifting gears of a virtual vehicle in the simulation. Given the U-shape and bent ends of device 100, the actuators 162, 164 keep with the strong ergonomics of the device. The actuators 162, 164 can be accessed from lower surfaces of the actuators by the index, middle and/or ring fingers while the device is held in a neutral and natural position.

In embodiments, controller 100 may further include an inertia measurement unit (IMU) 160 (FIG. 9) within the interior of the controller 100. FIG. 9 shows the IMU 160 within the hub 110, but the IMU may be located in one of the hand grips 102, 104 of base connector 106 in further embodiments. The IMU may be capable of measuring acceleration and rate of change in attitude (i.e., pitch, roll and yaw). In embodiments, the IMU may include a combination of accelerometers and angular rate sensors (gyroscopes) to track how a user is moving the controller 100 in six degrees of freedom. In particular, three accelerometers may be positioned such that their measuring axes are orthogonal to each other to be able to measure linear acceleration in three orthogonal directions, x, y and z. Three gyroscopes may also be positioned within the controller 100 such that their measuring axes are orthogonal to each other (pitch about the y axis, roll about the x axis, and yaw about the z axis).

The acceleration and change in attitude measured by the IMU may be used to control virtual on-screen moving objects. In a flying game, the controller may be moved in three dimensional real world space to affect movement of a controlled virtual aircraft in three-dimensional machine space. Where movement is two-dimensional (such as in a driving game), the third axis (z axis) detector is still useful to be able to interpret movements of the controller 100 regardless of its orientation relative to the z axis. Thus, a user may for example be able to use the controller to drive a car whether holding the controller in a generally vertical plane, horizontal plane, or any plane in between. As discussed in the following sections, the controller 100 is ergonomically designed for comfort when used in any of these orientations.

A conventional steering wheel controller is both circular and planar. In accordance with the present disclosure, the controller has a U-shaped design and downwardly bent ends of the hand grips. Moreover, the actuators are positioned at the bent ends of the hand grips. This design allows easy access to all of the control actuators regardless of the orientation of the controller.

It has been determined that operating game controllers while holding the wrist carpals, hand metacarpals and finger phalanges at awkward angles can result in strain and damage with prolonged use. Thus, for example, operating a controller with an angle between the wrist carpals and the forearm of greater than 25° can cause strain over time. Operating a controller with an angle between the carpals and hand metacarpals of greater than 25° can cause strain over time. And operating a controller with an angle between the metacarpals and finger phalanges of greater than 25° can cause strain over time. The controller 100 is ergonomically designed to minimize or prevent operation outside of these neutral angles whether the controller is held in the pronated or supinated position.

Figure 5:
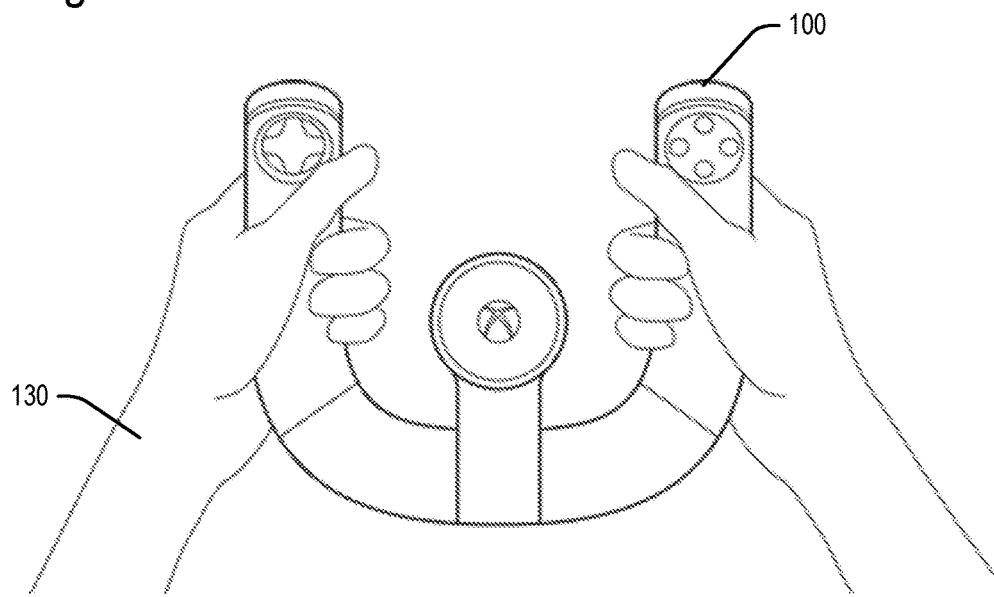
FIG. 5 is a top view of the controller being gripped with a pronated grip.
Figure 6:
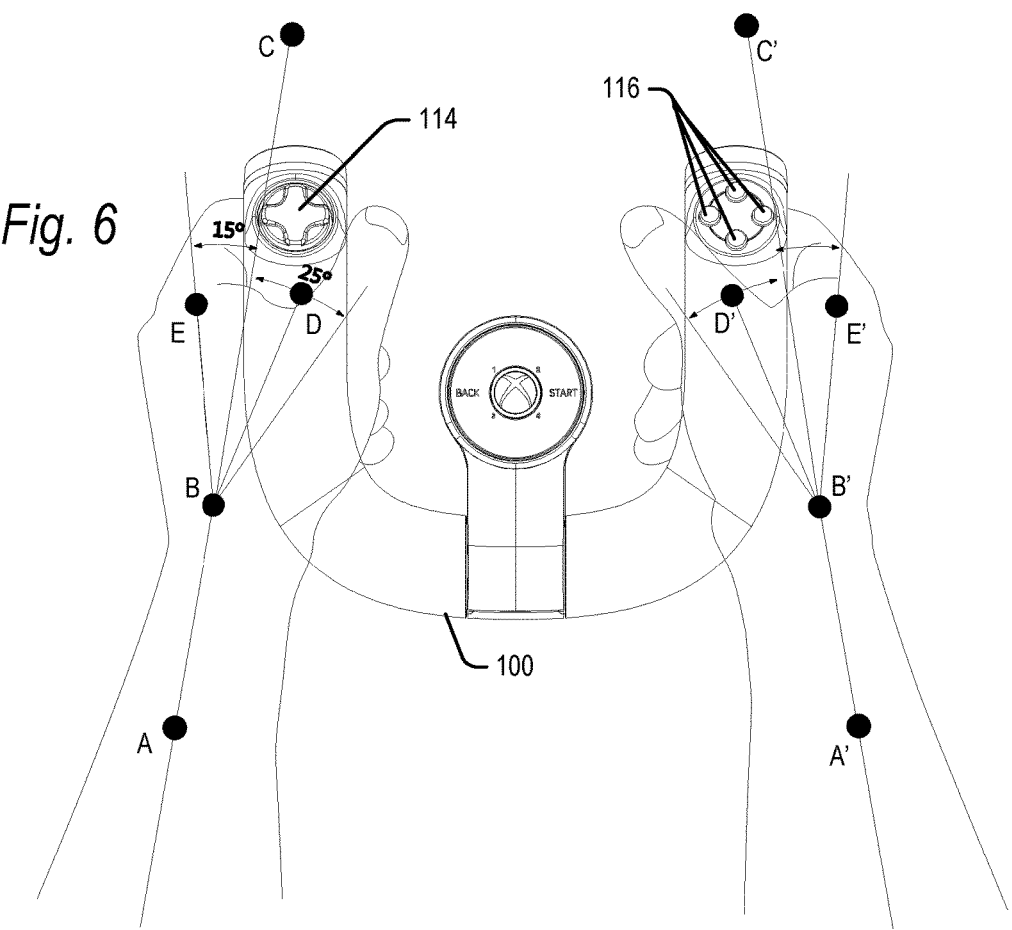
FIG. 6 is a top view of the controller being gripped with supinated grip and showing the angles formed by the various wrist, hand and finger joints.

FIG. 5 shows a user 130 holding the controller 100 in a generally pronated position; that is, generally at or near horizontal. Conversely, FIG. 6 shows the user 130 holding the controller 100 in a generally supinated position; that is, generally at or near vertical. FIG. 6 shows various angles formed while holding the controller 100 in the supinated position. In the supinated position, the wrist carpals form an angle indicated by a line through points ABC of approximately 0°. It has been determined that the first metacarpal of the thumb should not extend more than 25° from line ABC, with a relaxed and neutral center position at angle ABD, which is about in the middle of the neutral range of motion (12.5° from line ABC).

As can be seen, with the hand, wrist and fingers in the supinated position as shown, all portions of D-pad 114 may be accessed while all wrist, hand and finger joints remain within the neutral range of motion angles. For example, the first metacarpal can range to an angle of about 0° with respect to line ABC and access the extreme left portion of D-pad 114, and the first metacarpal can range to an angle of less than 25° and access the extreme right portion of D-pad 114.

It has also been determined that the second metacarpal of the index finger can range to an angle of about 25° with respect to line ABC and remain within the neutral range of motion for the second metacarpal. As shown in FIG. 6, when the controller is gripped in the supinated position, the second metacarpal may range to an angle ABE of about 15° with respect to line ABC to access trigger 126 on a bottom side of hand grip 102.

The same holds true for the actuation of the input buttons 116 by the right hand. In the supinated position, the wrist carpals of the right hand form an angle indicated by a line through points A'B'C' of approximately 0°. As can be seen, with the hand, wrist and fingers in the supinated position as shown, all of the input buttons 116 may be accessed while all wrist, hand and finger joints remain within the neutral range of motion angles. For example, the first metacarpal can range to an angle of about 0° with respect to line A'B'C' and access the extreme right input button 116, and the first metacarpal can range to an angle of less than 25° and access the extreme left input button 116. As shown in FIG. 6, when the controller is gripped in the supinated position, the second metacarpal may range to an angle A'B'E' of about 15° with respect to line A'B'C' to access trigger 128 on a bottom side of hand grip 104.

Figure 7:
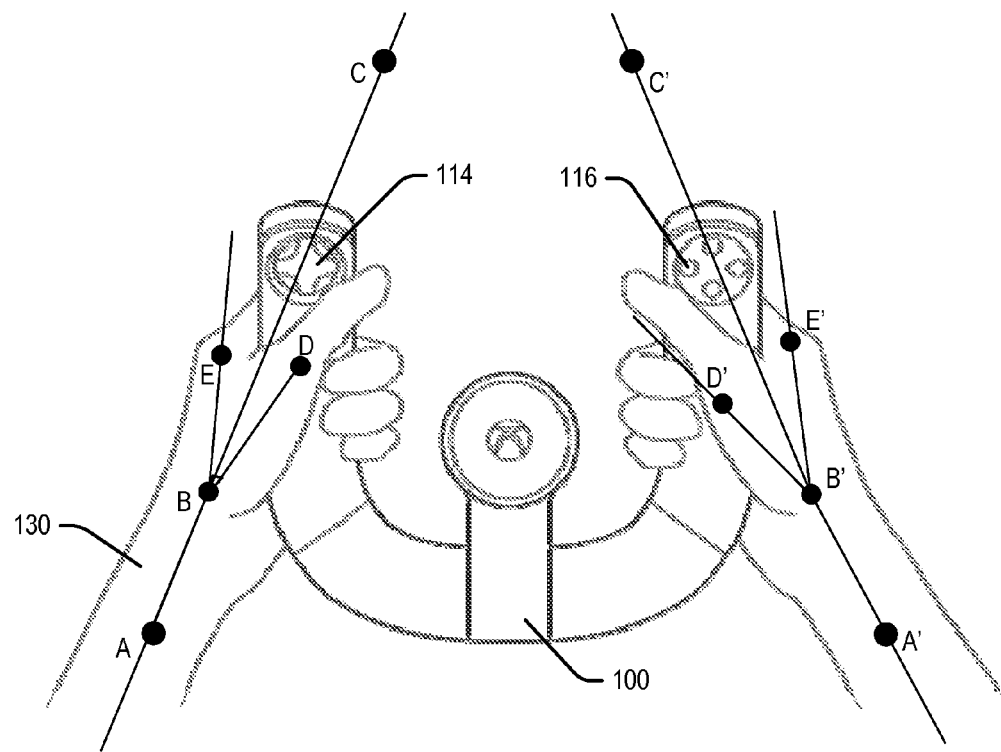
FIG. 7 is a top view of the controller being gripped with a pronated grip and showing the angles formed by the various wrist, hand and finger joints.

FIG. 7 shows a pronated grip of the controller 100. With this grip, the user's arms are more bent at the elbows, resulting in the forearms forming a larger angle with respect to the hand grips than in the supinated position. The user's left wrist carpals may still form a 0° angle with respect to the forearm to define a straight line ABC. At this angle, the user can access the rightmost portion of D-pad 114 within the neutral range of motion. In embodiments, the user may need to abduct slightly beyond the 25° range of neutral motion to access the leftmost portion of D-pad 114, but the amount of motion beyond the neutral range is small. When the controller is gripped in the pronated position, the second metacarpal may still range to an angle ABE of about 15° with respect to line ABC to access trigger 128 on a bottom side of hand grip 104. The same is true for accessing the input button 116 with the right hand when in the pronated position.

Figure 8:
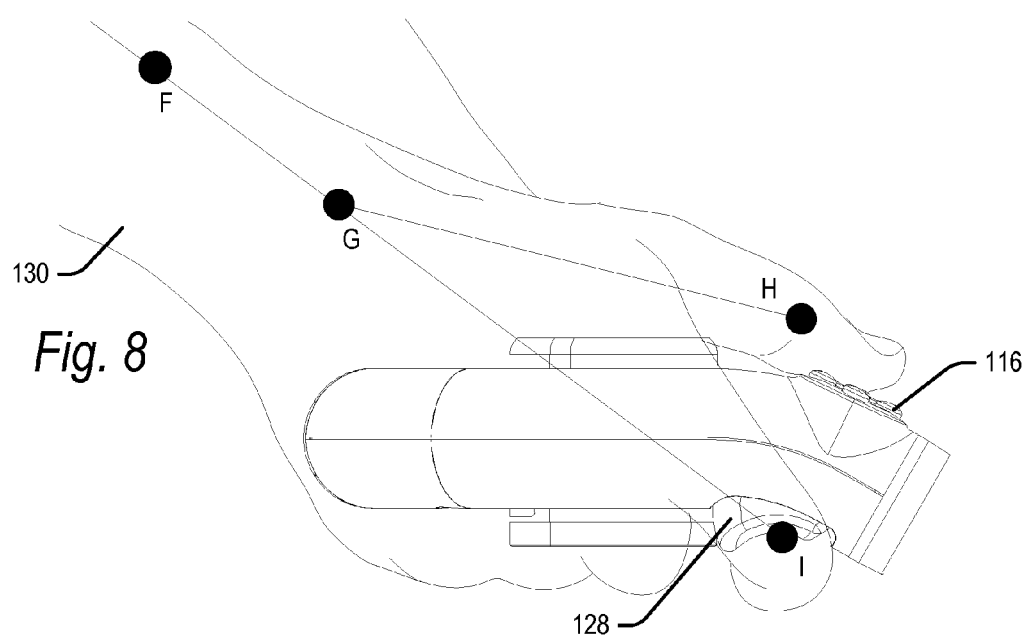
FIG. 8 is a side view of the controller being gripped with a supinated grip and showing the angles formed by the various wrist, hand and finger joints.

The downturn at the ends of hand grips 102, 104 further facilitates access of the controls while the wrist, hands and fingers remain in the neutral range of motion positions. FIG. 8 is a side view showing how the design maintains neutral hand/wrist posture in an example where the user is holding the controller in the supinated position. The wrist forms an angle FGI which is approximately 10° from a straight line with respect to the forearm (e.g., angle FGI is about 170°). The first metacarpal forms an angle HGI of about 20° with respect to the wrist. In examples, the metacarpal-phalangeal joint may be flexed about 10°, and the interphalangeal joints may be flexed about 5°. The third through fifth metacarpal-phalangeal joints may wrap around the hand grip 104 in a relaxed 45°. The proximal interphalangeal joints may be flexed 30-45°, and the digital interphalangeal joints flexed 10-20°. Each of these flexures of the ulnar-carpal joints, the carpal-metacarpal joints, the metacarpal-phalangeal joints, and the interphalangeal joints is within the neutral range of motion. It is understood that all of the above-described wrist, hand and finger joint angles are by way of example only, and may vary beyond the above examples in further embodiments.

Controller 100 includes further features to improve the user's experience with the controller. Referring to FIG. 9, the controller includes rumble motors 150 positioned within respective hand grips 102 and 104. Rumble motors 150 are known and may be used to provide tactile feedback from the video game. For example, if a user is running up against a virtual wall on the left side of a virtual car being controlled by the user, the left rumble motor may vibrate to provide tactile feedback of the condition. Both rumble motors may activate in a combat game when the user is hit with virtual artillery.

In order to further improve the user experience, the rumble motors 150 are positioned within the hand grips 102, 104 directly beneath a user's palms when gripping the controller. This has the benefit of transmitting the rumble forces directly to the user's palms, while having relatively low rumble forces, if any, out at the ends 102b and 104b. This minimizes any interference rumble forces at the ends may cause with a user's operation of the controls.

The controller further includes lights 156 on the ends of hand grips 102 and 104. The lights may be used to provide visual feedback on the controller 100 of any of various in-game activities and conditions. The lights 156 may operate in tandem with the rumble motors 150 for additional feedback when one or both rumble motors 150 activate. As a further example, one of the lights may activate to provide feedback when a user is near or against a virtual wall on one side of a virtual car being controlled by the user. As the controller 100 is U-shaped instead of circular, the lights 156 may be provided on the ends of the hand grips 102 and 104.

Figure 10:
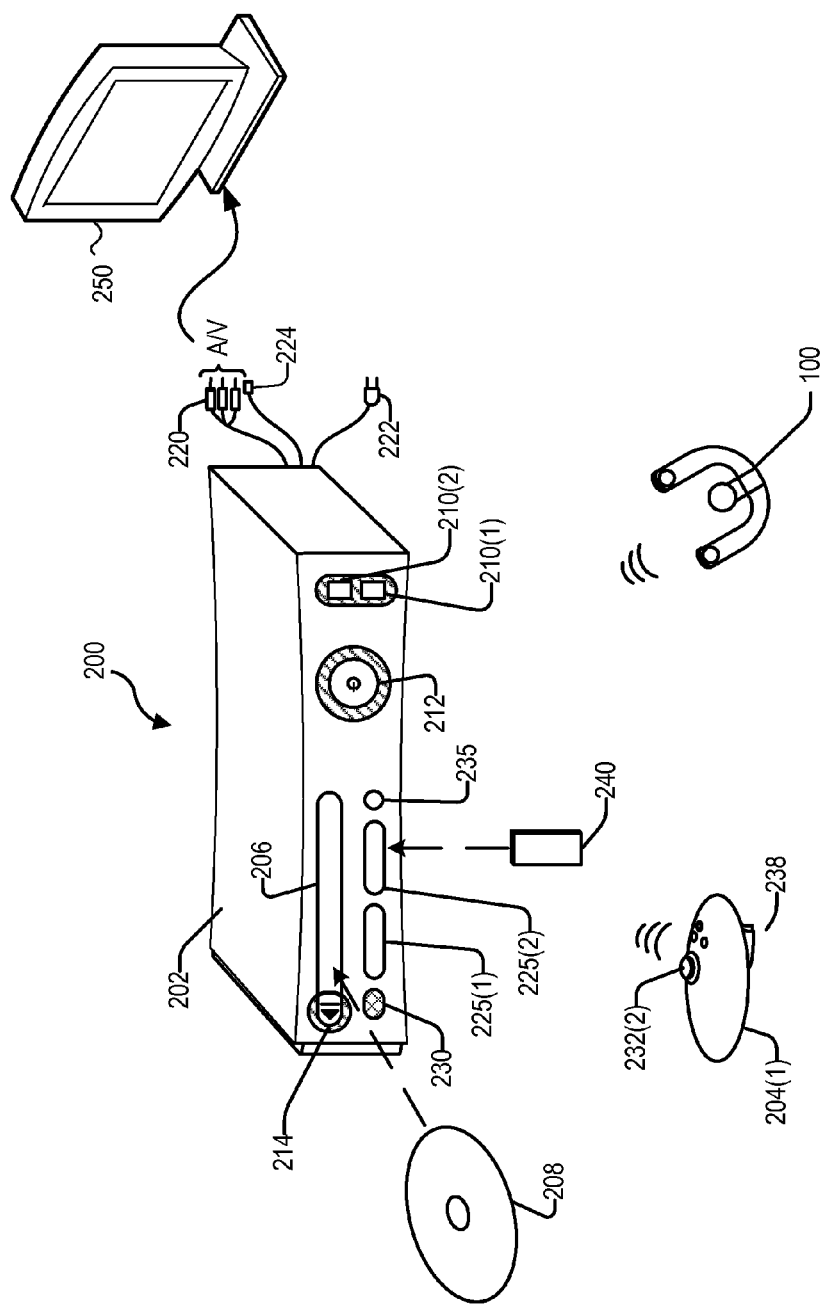
FIG. 10 is a perspective view of an exemplary gaming and media system.

FIG. 10 shows an exemplary gaming and media system 200. The following discussion of FIG. 10 is intended to provide a brief, general description of a suitable environment in which concepts presented herein may be implemented. As shown in FIG. 10, gaming and media system 200 includes a game and media console (hereinafter "console") 202. In general, console 202 is one type of computing system, as will be further described below. Console 202 is configured to accommodate one or more wireless controllers, including controller 100 and controller 204(1). Console 202 is equipped with an internal hard disk drive (not shown) and a portable media drive 206 that support various forms of portable storage media, as represented by optical storage disc 208. Examples of suitable portable storage media include DVD, CD-ROM, game discs, and so forth. Console 202 also includes two memory unit card receptacles 225(1) and 225(2), for receiving removable flash-type memory units 240. A command button 235 on console 202 enables and disables wireless peripheral support.

As depicted in FIG. 10, console 202 also includes an optical port 230 for communicating wirelessly with one or more devices and two USB (Universal Serial Bus) ports 210(1) and 210(2) to support a wired connection for additional controllers, or other peripherals. In some implementations, the number and arrangement of additional ports may be modified. A power button 212 and an eject button 214 are also positioned on the front face of game console 202. Power button 212 is selected to apply power to the game console, and can also provide access to other features and controls, and eject button 214 alternately opens and closes the tray of a portable media drive 206 to enable insertion and extraction of a storage disc 208.

Console 202 connects to a television or other display (such as monitor 250) via A/V interfacing cables 220. In one implementation, console 202 is equipped with a dedicated A/V port (not shown) configured for content-secured digital communication using A/V cables 220 (e.g., A/V cables suitable for coupling to a High Definition Multimedia Interface "HDMI" port on a high definition monitor 250 or other display device). A power cable 222 provides power to the game console. Console 202 may be further configured with broadband capabilities, as represented by a cable or modem connector 224 to facilitate access to a network, such as the Internet. The broadband capabilities can also be provided wirelessly, through a broadband network such as a wireless fidelity (Wi-Fi) network.

Each controller 100, 204 is coupled to console 202 via a wired or wireless interface. In the illustrated implementation, the controllers 100, 204 are USB-compatible and are coupled to console 202 via a wireless or USB port 210. Console 202 may be equipped with any of a wide variety of user interaction mechanisms.

In one implementation, a memory unit (MU) 240 may also be inserted into a controller 100, 204 to provide additional and portable storage. Portable MUs enable users to store game parameters for use when playing on other consoles. In this implementation, each controller is configured to accommodate two MUs 240, although more or less than two MUs may also be employed.

Gaming and media system 200 is generally configured for playing games stored on a memory medium, as well as for downloading and playing games, and reproducing pre-recorded music and videos, from both electronic and hard media sources. With the different storage offerings, titles can be played from the hard disk drive, from an optical disk media (e.g., 208), from an online source, or from MU 240. Samples of the types of media that gaming and media system 200 is capable of playing include:

Game titles played from CD and DVD discs, from the hard disk drive, or from an online source;

Digital music played from a CD in portable media drive 206, from a file on the hard disk drive (e.g., music in the Windows Media Audio (WMA) format), or from online streaming sources; and Digital audio/video played from a DVD disc in portable media drive 206, from a file on the hard disk drive (e.g., Active Streaming Format), or from online streaming sources.

During operation, console 202 is configured to receive input from controllers 100, 204 and display information on display 250. For example, console 202 can display a user interface on display 250 to allow a user to select a game using controller 100, 204 and display achievement information as discussed below.

Figure 11:
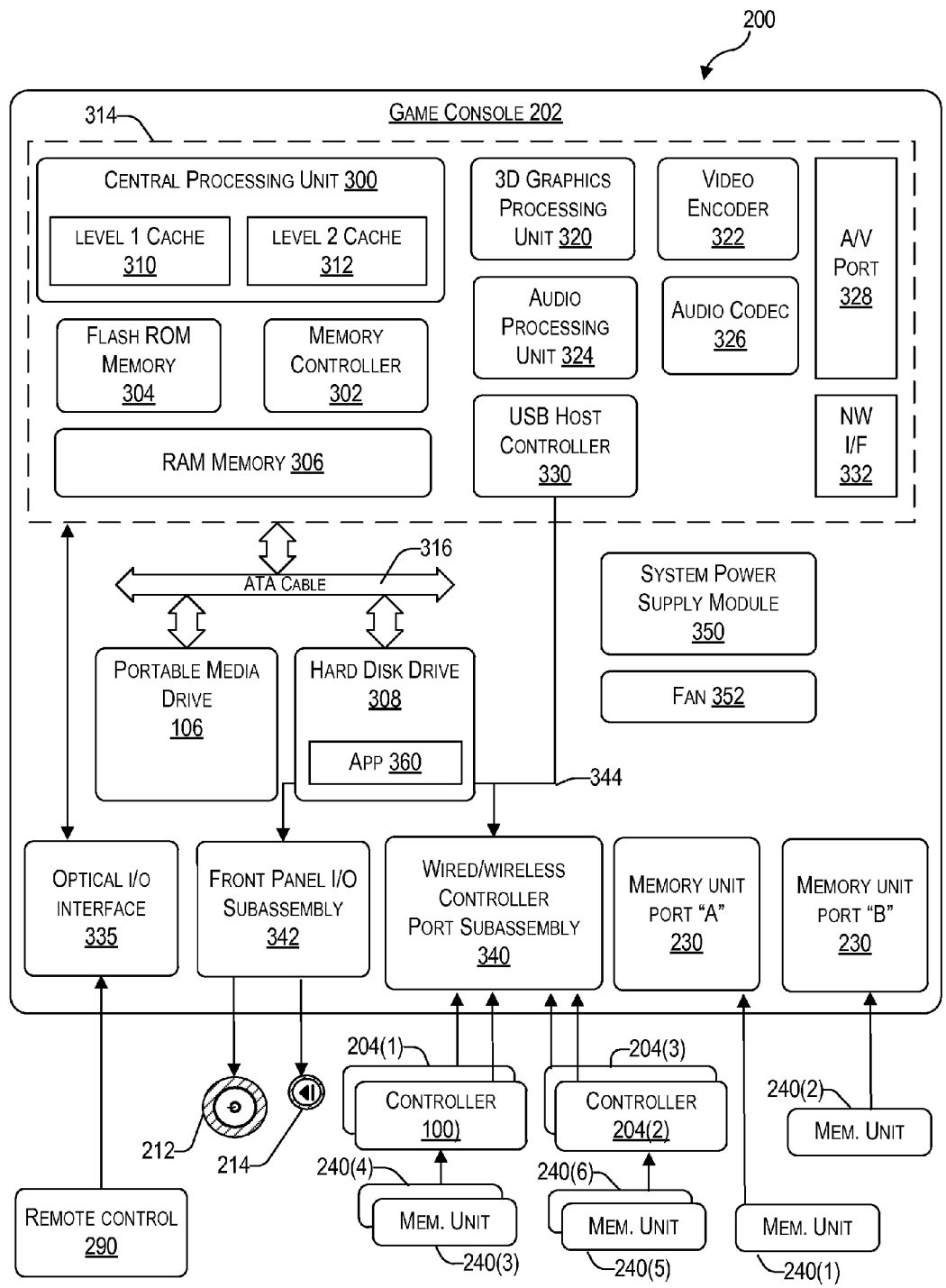
FIG. 11 is an exemplary functional block diagram of components of the gaming and media system shown in FIG. 10.

FIG. 11 is a functional block diagram of gaming and media system 200 and shows functional components of gaming and media system 200 in more detail. Console 202 has a central processing unit (CPU) 300, and a memory controller 302 that facilitates processor access to various types of memory, including a flash Read Only Memory (ROM) 304, a Random Access Memory (RAM) 306, a hard disk drive 308, and portable media drive 206. In one implementation, CPU 300 includes a level 1 cache 310 and a level 2 cache 312, to temporarily store data and hence reduce the number of memory access cycles made to the hard drive 308, thereby improving processing speed and throughput.

CPU 300, memory controller 302, and various memory devices are interconnected via one or more buses (not shown). The details of the bus that is used in this implementation are not particularly relevant to understanding the subject matter of interest being discussed herein. However, it will be understood that such a bus might include one or more of serial and parallel buses, a memory bus, a peripheral bus, and a processor or local bus, using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

In one implementation, CPU 300, memory controller 302, ROM 304, and RAM 306 are integrated onto a common module 314. In this implementation, ROM 304 is configured as a flash ROM that is connected to memory controller 302 via a PCI bus and a ROM bus (neither of which are shown). RAM 306 is configured as multiple Double Data Rate Synchronous Dynamic RAM (DDR SDRAM) modules that are independently controlled by memory controller 302 via separate buses (not shown). Hard disk drive 308 and portable media drive 206 are shown connected to the memory controller 302 via the PCI bus and an AT Attachment (ATA) bus 316. However, in other implementations, dedicated data bus structures of different types can also be applied in the alternative.

A three-dimensional graphics processing unit 320 and a video encoder 322 form a video processing pipeline for high speed and high resolution (e.g., High Definition) graphics processing. Data are carried from graphics processing unit 320 to video encoder 322 via a digital video bus (not shown). An audio processing unit 324 and an audio codec (coder/decoder) 326 form a corresponding audio processing pipeline for multi-channel audio processing of various digital audio formats. Audio data are carried between audio processing unit 324 and audio codec 326 via a communication link (not shown). The video and audio processing pipelines output data to an (audio/video) port 328 for transmission to a television or other display. In the illustrated implementation, video and audio processing components 320-228 are mounted on module 314.

FIG. 11 shows module 314 including a USB host controller 330 and a network interface 332. USB host controller 330 is shown in communication with CPU 300 and memory controller 302 via a bus (e.g., PCI bus) and serves as host for peripheral controllers 100 and 204(1)-104(3). Network interface 332 provides access to a network (e.g., Internet, home network, etc.) and may be any of a wide variety of various wire or wireless interface components including an Ethernet card, a modem, a wireless access card, a Bluetooth module, a cable modem, and the like.

In the implementation depicted in FIG. 11, console 202 includes a controller support subassembly 340 for supporting four controllers 100 and 204(1)-104(3). The controller support subassembly 340 includes any hardware and software components needed to support wired and wireless operation with an external control device, such as for example, a media and game controller. A front panel I/O subassembly 342 supports the multiple functionalities of power button 212, the eject button 214, as well as any LEDs (light emitting diodes) or other indicators exposed on the outer surface of console 202. Subassemblies 340 and 342 are in communication with module 314 via one or more cable assemblies 344. In other implementations, console 202 can include additional controller subassemblies. The illustrated implementation also shows an optical I/O interface 335 that is configured to send and receive signals that can be communicated to module 314.

MUs 240(1) and 240(2) are illustrated as being connectable to MU ports "A" 230(1) and "B" 230(2) respectively. Additional MUs (e.g., MUs 240(3)-240(6)) are illustrated as being connectable to controllers 100 and 204(2), i.e., two MUs for each controller. Controllers 204(1) and 204(3) can also be configured to receive MUs (not shown). Each MU 240 offers additional storage on which games, game parameters, and other data may be stored. In some implementations, the other data can include any of a digital game component, an executable gaming application, an instruction set for expanding a gaming application, and a media file. When inserted into console 202 or a controller, MU 240 can be accessed by memory controller 302.

A system power supply module 350 provides power to the components of gaming system 200. A fan 352 cools the circuitry within console 202.

An application 360 comprising machine instructions is stored on hard disk drive 308. When console 202 is powered on, various portions of application 360 are loaded into RAM 306, and/or caches 310 and 312, for execution on CPU 300, wherein application 360 is one such example. Various applications can be stored on hard disk drive 308 for execution on CPU 300.

Gaming and media system 200 may be operated as a standalone system by simply connecting the system to monitor 250 (FIG. 10), a television, a video projector, or other display device. In this standalone mode, gaming and media system 200 enables one or more players to play games, or enjoy digital media, e.g., by watching movies, or listening to music. However, with the integration of broadband connectivity made available through network interface 332, gaming and media system 200 may further be operated as a participant in a larger network gaming community The foregoing detailed description of the inventive system has been presented for purposes of illustration and description. It is not intended to be exhaustive or to limit the inventive system to the precise form disclosed. Many modifications and variations are possible in light of the above teaching. The described embodiments were chosen in order to best explain the principles of the inventive system and its practical application to thereby enable others skilled in the art to best utilize the inventive system in various embodiments and with various modifications as are suited to the particular use contemplated. It is intended that the scope of the inventive system be defined by the claims appended hereto.

What is claimed:

1. A controller for controlling a video game in a gaming system, comprising:

a base connector having a base connector axis through a center of the base connector;

first and second hand grips attached to and extending from the base connector in a direction such that the controller is configured to be held by the first and second hand grips by a user with the base connector being nearest fifth metacarpals of first and second hands of a user, the first and second hand grips having respective first and second hand grip axes through a center of the first and second hand grips, a reference plane being defined including the base connector axis and the first and second hand grip axes;

a first end connected to an end of the first hand grip, the first end extending at an oblique angle with respect to the reference plane;

a second end connected to an end of the second hand grip extending at an oblique angle with respect to the reference plane;

a first set of one or more controls on the first end;

a second set of one or more controls on the second end;

a connector section having a first end extending in the direction from the base connector between the first and second hand grips, the connector section extending perpendicularly to the base connector;

a hub formed on a second end of the connector section, the hub having a cylindrical shape including a ring on a surface of the cylindrical shape, the ring including a third set of one or more controls, the third set of one or more controls configured to be actuated by one of a thumb and finger of a user while the user is gripping the first and second hand grips; and the shape of the first and second hand grips allowing the controller to be held in a neutral hand position while in a generally vertical position with the user's thumbs and fingers wrapped around the first and second hand grips for communicating controls to the video game, and the shape of the first and second hand grips and first and second ends allowing the controller to be held in a neutral hand position while in a generally horizontal position with the user's fingers wrapped around the first and second hand grips and the user's thumbs engaging the first and second sets of one or more controls on the first and second ends for communicating controls to the video game.

2. The controller of claim 1, wherein the first and second ends form an angle of between 15° and 45° with the remaining portions of the first and second hand grips.

3. The controller of claim 1, wherein the first and second ends form an angle of approximately 15° with the remaining portions of the first and second hand grips.

4. The controller of claim 1, wherein the first set of one or more controls comprises a first group of one or more controls on a top surface when the controller is held in a horizontal plane and a second group of one or more controls on a bottom surface opposite the top surface, and wherein the second set of one or more controls comprises a third group of one or more controls on a top surface and a fourth group of one or more controls on a bottom surface opposite the top surface.

5. The controller of claim 4, wherein turning of the controller within a user's hands is used to steer a virtual object and wherein the second and fourth groups of controls are used to accelerate and decelerate the virtual object.

6. A controller for steering a virtual automobile in a video game in a gaming system, comprising:

a base connector having a base connector axis through a center of the base connector;

first and second hand grips attached to and extending from the base connector in a direction such that the controller is configured to be held by the first and second hand grips by a user with the base connector being nearest fifth metacarpals of first and second hands of a user, the first and second hand grips having respective first and second hand grip axes through a center of the first and second hand grips, a reference plane being defined including the base connector axis and the first and second hand grip axes;

a first end connected to an end of the first hand grip, the first end extending at an oblique angle with respect to the reference plane, and at least a portion of the first end having the same shape in cross section as the first hand grip;

a second end connected to an end of the second hand grip extending at an oblique angle with respect to the reference plane, and at least a portion of the second end having the same shape in cross section as the second hand grip;

a first set of one or more controls on the first end;

a second set of one or more controls on the second end;

a connector section having a first end extending in the direction from the base connector between the first and second hand grips, the connector section extending perpendicularly to the base connector;

a hub formed on a second end of the connector section, the hub having a cylindrical shape including a ring on a surface of the cylindrical shape, the ring including a third set of one or more controls; and the first and second hand grips facilitating holding of the controller in a generally vertical position with a user's thumbs and fingers wrapped around the first and second hand grips for communicating controls to the video game, and the first and second hand grips and first and second ends facilitating holding of the controller in a generally horizontal position with the user's fingers wrapped around the first and second hand grips and the user's thumbs engaging the first and second sets of one or more controls on the first and second ends for communicating controls to the video game.

7. The controller of claim 6, wherein the first and second hand grips are spaced from each other and have axes extending from the base connector that are parallel to each other.

8. The controller of claim 6, wherein the first set of one or more controls comprises a first group of one or more controls on a top surface when the controller is held in a horizontal plane and a second group of one or more controls on a bottom surface opposite the top surface.

9. The controller of claim 8, wherein the second set of one or more controls comprises a third group of one or more controls on a top surface when the controller is held in a horizontal plane and a fourth group of one or more controls on a bottom surface opposite the top surface.

10. The controller of claim 6, wherein the first and second hand grips include rumble motors within the hand grips for providing tactile feedback, the rumble motors positioned to be beneath a user's palms and spaced from the first and second ends when the user grips the controller.

11. The controller of claim 6, wherein the first and second ends further include lights for indicating actions and conditions from the video game.

12. The controller of claim 6, wherein the controller communicates wirelessly with a computing device executing the video game.

13. A controller for controlling a video game in a gaming system, comprising:
- a base connector having a base connector axis through a center of the base connector;
- first and second hand grips attached to and extending from the base connector, the first and second hand grips having respective first and second hand grip axes through a center of the first and second hand grips and being circular in cross section perpendicular to the first and second had grip axes, a reference plane being defined including the base connector axis and the first and second hand grip axes;
- a first end connected to an end of the first hand grip, the first end extending at an oblique angle with respect to the reference plane;
- a second end connected to an end of the second hand grip extending at an oblique angle with respect to the reference plane;
- a hub extending from the base connector between the first and second hand grips;
- a first set of one or more controls on the first end;
- a second set of one or more controls on the second end;
- a third set of one or more controls on the hub;
- lights provided on the first and second ends of the first and second hand grips, the lights indicating actions and conditions from the video game;
- the shape of the first and second hand grips allowing the controller to be held in a neutral hand position while in a generally vertical position with a user's thumbs and fingers wrapped around the first and second hand grips for communicating controls to the video game, and the shape of the first and second hand grips and first and second ends allowing the controller to be held in a neutral hand position while in a generally horizontal position with the user's fingers wrapped around the first and second hand grips and the user's thumbs engaging the first and second sets of one or more controls on the first and second ends for communicating controls to the video game.

14. The controller of claim 13, wherein the controller may be held in the generally vertical position to steer a virtual car displayed to the user in the video game.

15. The controller of claim 13, wherein the controller communicates wirelessly with a computing device executing the video game.

16. The controller of claim 13, wherein the controller communicates wirelessly with a computing device executing the video game.

17. A controller for controlling a video game in a gaming system, comprising:
- a base connector having a base connector axis through a center of the base connector;
- first and second hand grips attached to and extending from the base connector, the first and second hand having respective first and second hand grip axes through a center of the first and second hand grips and being circular in cross section perpendicular to the first and second had grip axes, a reference plane being defined including the base connector axis and the first and second hand grip axes;
- a first end connected to an end of the first hand grip, the first end extending at an oblique angle with respect to the reference plane;
- a second end connected to an end of the second hand grip extending at an oblique angle with respect to the reference plane;
- a hub extending from the base connector between the first and second hand grips, the hub having a cylindrical shape about an axis perpendicular to the reference plane, the hub comprising an actuatable ring in a surface of the cylindrical shape;
- a first set of one or more controls on the first end;
- a second set of one or more controls on the second end;
- a third set of one or more controls on the actuatable ring of the hub;
- the shape of the first and second hand grips allowing the controller to be held in a neutral hand position while in a generally vertical position with a user's thumbs and fingers wrapped around the first and second hand grips for communicating controls to the video game, and the shape of the first and second hand grips and first and second ends allowing the controller to be held in a neutral hand position while in a generally horizontal position with the user's fingers wrapped around the first and second hand grips and the user's thumbs engaging the first and second sets of one or more controls on the first and second ends for communicating controls to the video game.

18. The controller of claim 17, wherein the third set of one or more controls on the actuatable ring of the hub are configured to be actuated by a thumb or finger of the user while the user grips the first and second hand grips.

19. The controller of claim 17, wherein the controller may be held in the generally vertical position to steer a virtual car displayed to the user in the video game.

* * * * *